(12) United States Patent
Hars et al.

(10) Patent No.: US 9,767,322 B2
(45) Date of Patent: *Sep. 19, 2017

(54) DATA TRANSCRIPTION IN A DATA STORAGE DEVICE

(71) Applicant: Seagate Technology LLC, Cupertino, CA (US)

(72) Inventors: Laszlo Hars, Lafayette, CO (US); Robert H Thibadeau, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/471,997

(22) Filed: Aug. 28, 2014

(65) Prior Publication Data

US 2015/0058638 A1 Feb. 26, 2015

Related U.S. Application Data

(63) Continuation of application No. 11/085,923, filed on Mar. 22, 2005, now Pat. No. 8,832,458.

(51) Int. Cl.
*H04L 29/06* (2006.01)
*G06F 21/78* (2013.01)
*H04L 9/32* (2006.01)

(52) U.S. Cl.
CPC ............... *G06F 21/78* (2013.01); *H04L 9/32* (2013.01); *H04L 63/0464* (2013.01); *H04L 63/08* (2013.01); *G06F 2221/2107* (2013.01)

(58) Field of Classification Search
CPC ... G06F 21/78; G06F 2221/2107; H04L 9/32; H04L 63/0428; H04L 63/0464; H04L 63/08
USPC .................................... 713/189, 193; 726/34
See application file for complete search history.

(56) References Cited

U.S. PATENT DOCUMENTS

| | | | | |
|---|---|---|---|---|
| 5,142,578 A | * | 8/1992 | Matyas | G06F 9/30003 380/280 |
| 5,448,045 A | * | 9/1995 | Clark | 235/382 |
| 6,385,727 B1 | * | 5/2002 | Cassagnol | G06F 21/10 380/259 |
| 6,748,080 B2 | * | 6/2004 | Russ et al. | 380/239 |
| 6,898,577 B1 | * | 5/2005 | Johnson | 705/51 |
| 8,832,458 B2 | * | 9/2014 | Hars et al. | 713/189 |
| 2001/0032280 A1 | * | 10/2001 | Osakada | G06F 13/4022 710/305 |
| 2002/0199110 A1 | * | 12/2002 | Kean | G06F 17/5054 713/189 |
| 2003/0061494 A1 | * | 3/2003 | Girard et al. | 713/189 |

(Continued)

*Primary Examiner* — Sarah Su
(74) *Attorney, Agent, or Firm* — Cesari & Reed, LLP; Kirk A. Cesari; Logan Brown

(57) ABSTRACT

A method of protecting information in a data storage device is provided. The method includes receiving, in the data storage device, encrypted data via a host computer in which the data storage device is employed. The encrypted data is then decrypted, and re-encrypted, in the data storage device, either before storage or just before data is transferred back to the host computer. The decryption and re-encryption (transcription) is performed substantially independently of the host computer. In addition, a data storage device, readable by a computer system, for implementing the above method for protecting information is provided.

18 Claims, 5 Drawing Sheets

(56) References Cited

U.S. PATENT DOCUMENTS

| | | | |
|---|---|---|---|
| 2003/0108205 A1* | 6/2003 | Joyner et al. | 380/277 |
| 2004/0190181 A1* | 9/2004 | Hikosaka et al. | 360/69 |
| 2005/0183072 A1* | 8/2005 | Horning | G06F 21/14 717/140 |
| 2005/0228752 A1* | 10/2005 | Konetski et al. | 705/51 |
| 2005/0262025 A1* | 11/2005 | Wajih et al. | 705/64 |
| 2006/0088167 A1* | 4/2006 | Bade et al. | 380/281 |
| 2009/0262936 A1* | 10/2009 | Cho | G11B 20/00086 380/255 |
| 2010/0229005 A1* | 9/2010 | Herman | G06F 12/1408 713/193 |

* cited by examiner

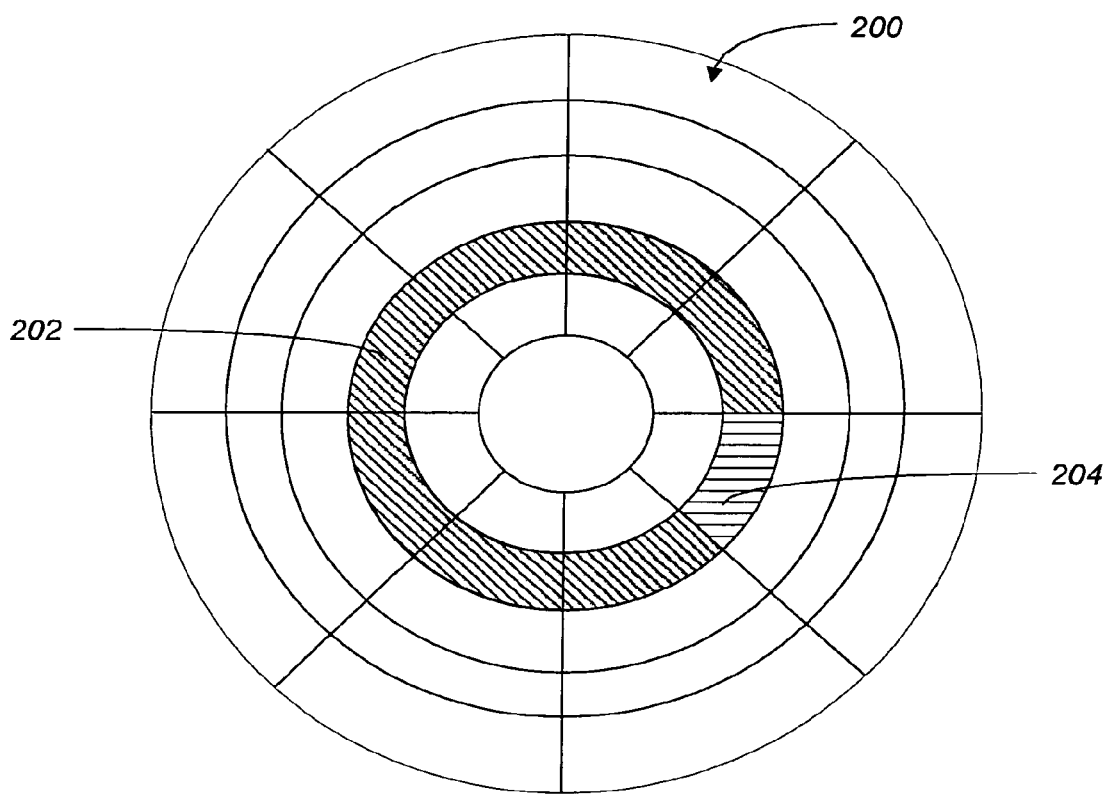
FIG._2

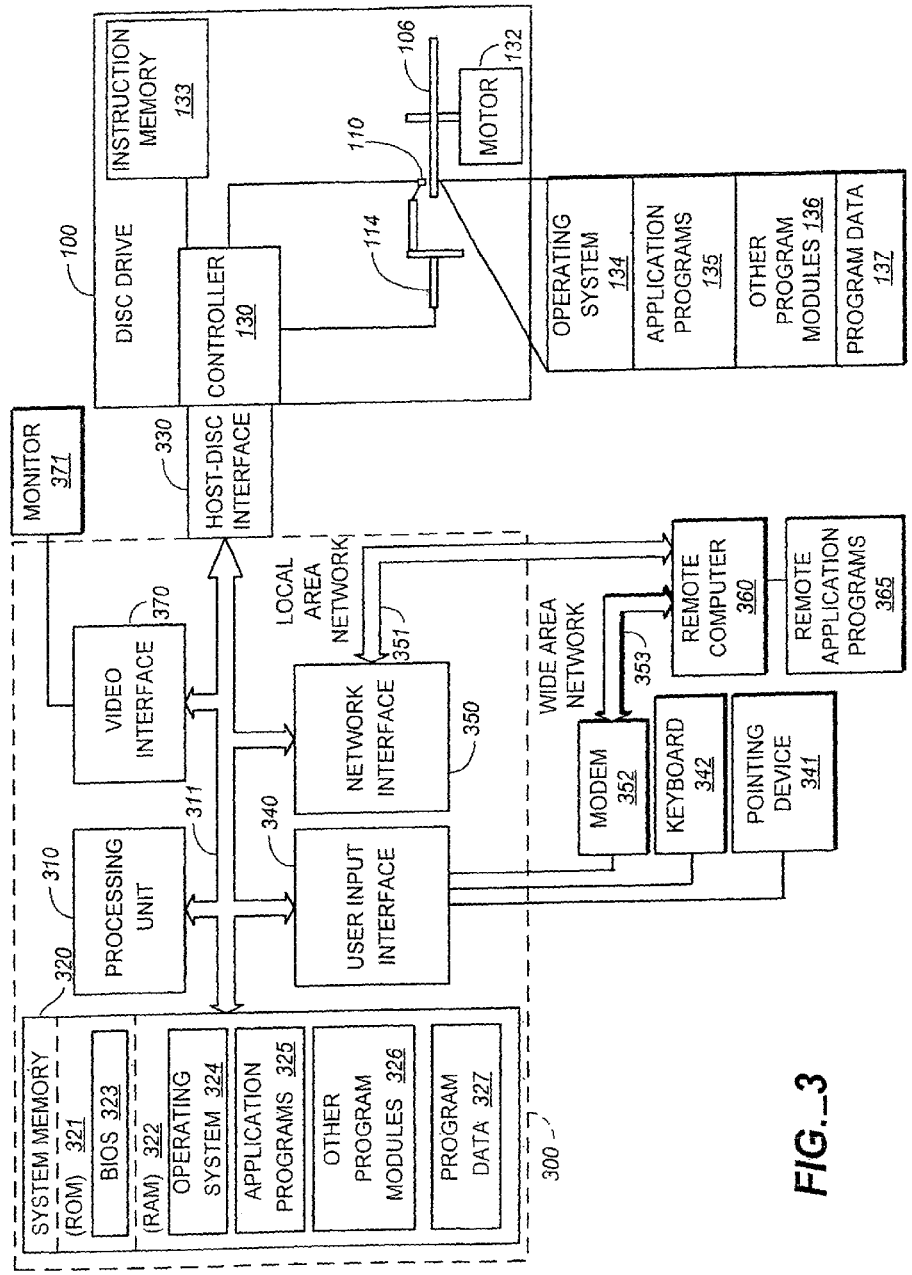
FIG._3

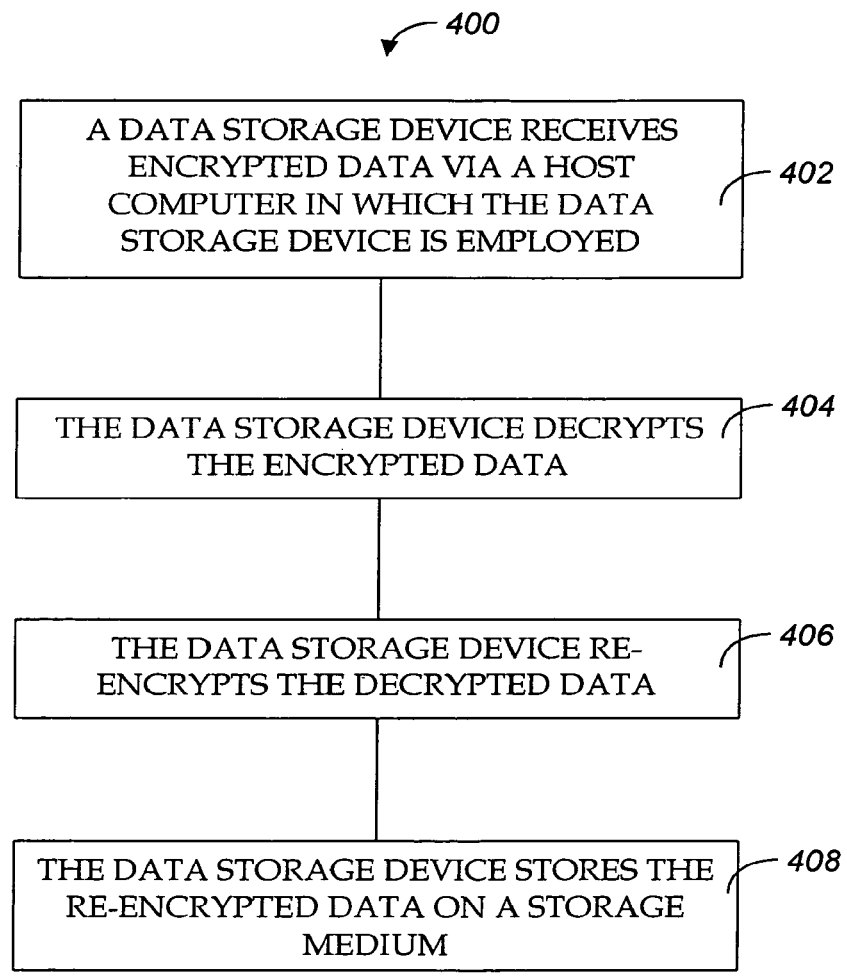
FIG._4

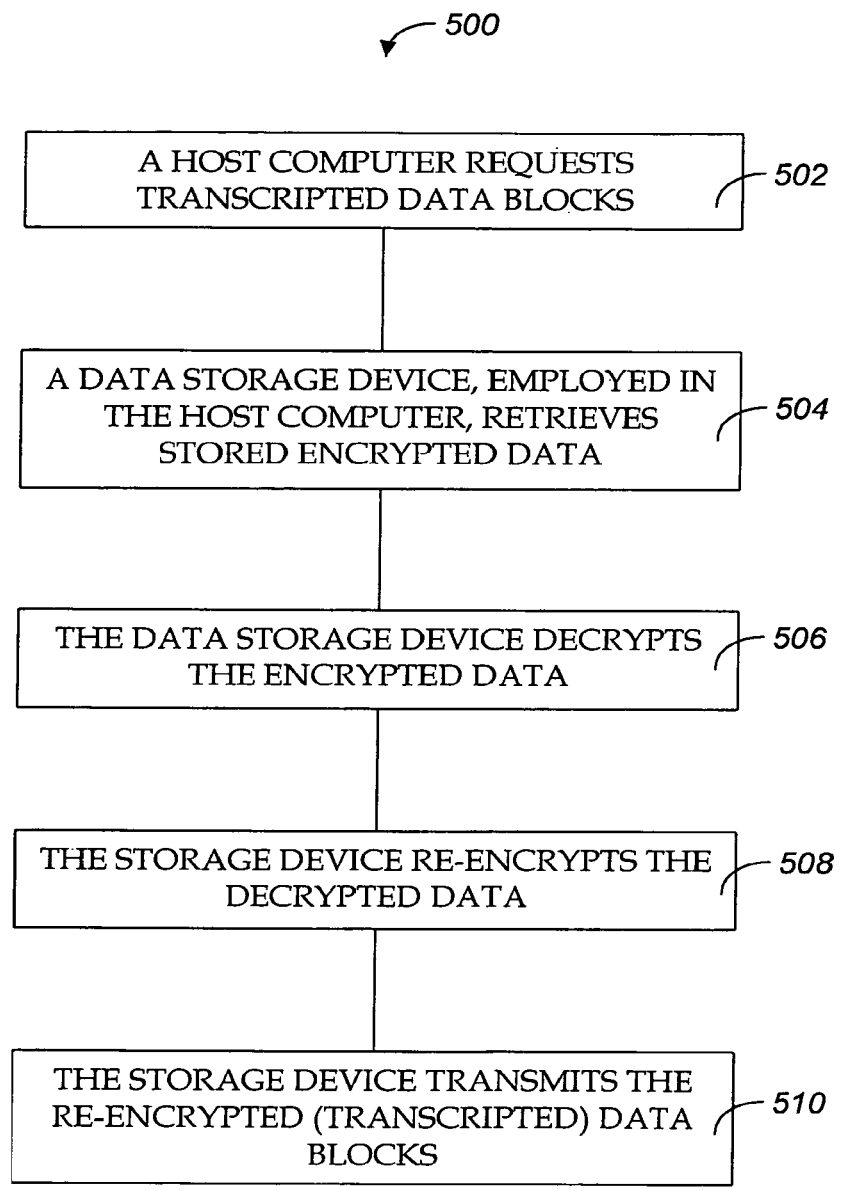
FIG._5

_DATA TRANSCRIPTION IN A DATA STORAGE DEVICE_

CROSS-REFERENCE TO RELATED APPLICATIONS

This application is a continuation of and claims priority to co-pending U.S. patent application Ser. No. 11/085,923, entitled "DATA TRANSCRIPTION IN A DATA STORAGE DEVICE", which was filed Mar. 22, 2005, the contents of which is incorporated herein by reference in its entirety.

FIELD OF THE INVENTION

The present invention relates generally to data storage devices. More particularly, the present invention relates to data transcription in a data storage device.

BACKGROUND OF THE INVENTION

Mass storage devices are one of many components of modern computers. One type of mass storage device is a fixed disc drive. Such drives are used to store vast amounts of information relating to operating systems, applications, user data and copyrighted information (licensed software, digital music, video, books, etc.). Some of this information is critical to the functioning of the host system in which the disc drive operates. In addition, the recent dramatic decrease in the cost of disc drives has resulted in them being used in many non-conventional applications, such as, audio/video applications, internet set-top boxes, gaming stations, etc. All these applications require special software to be pre-loaded onto a disc. If application software or other critical information is intentionally or unintentionally overwritten, significant losses could occur. Thus, these applications require sophisticated write protection security features. Further, schemes for prevention of unauthorized access of confidential data are also required.

Currently, write protection schemes, and schemes for the prevention of unauthorized access of data (user data and copyrighted information) are primarily implemented in the host computer, with the disc drive having little or no control over the operation of these schemes. Such host-dependent schemes may, under certain conditions, expose confidential information to a user of the host computer who is not an owner of the confidential information. Therefore, there is a need for such information to be protected by a scheme that operates substantially independently of the host computer.

Embodiments of the present invention provide solutions to these and other problems, and offer other advantages over the prior art.

SUMMARY OF THE INVENTION

The present invention relates to a system for transcription of confidential data that is implemented within a data storage device and operates substantially independently of a host computer, thereby addressing the above-mentioned problem.

In accordance with an embodiment of the invention, a method of protecting information in a data storage device is provided. The method includes receiving, in the data storage device, encrypted data via a host computer in which the data storage device is employed. The encrypted data is then decrypted, and re-encrypted, in the data storage device. The decryption and re-encryption (transcription) is performed substantially independently of the host computer.

Another mode of operation is when the host computer requests stored encrypted data, which is to be encrypted with a different cipher and/or with a different key than the stored data was encrypted with. The data storage device retrieves the requested blocks of data, decrypts them, and re-encrypts these blocks of data before transferring them to the host.

The present invention can also be implemented as a data storage device which tangibly embodies a program of instructions executable by a controller of the data storage device to perform the above transcription method.

These and various other features as well as advantages, which characterize the present invention, will be apparent upon reading the following detailed description and review of the associated drawings.

BRIEF DESCRIPTION OF THE DRAWINGS

FIG. 2 is a diagrammatic view of a surface of a disc employed in the disc drive of FIG. 1.

FIG. 3 is a block diagram showing a disc drive of the present invention coupled to a host computer.

FIG. 4 is a flowchart of a transcription-before-storage method embodiment of the present invention.

FIG. 5 is a flowchart of a transcription-after-storage method embodiment of the present invention.

DETAILED DESCRIPTION OF ILLUSTRATIVE EMBODIMENTS

Figure 1:
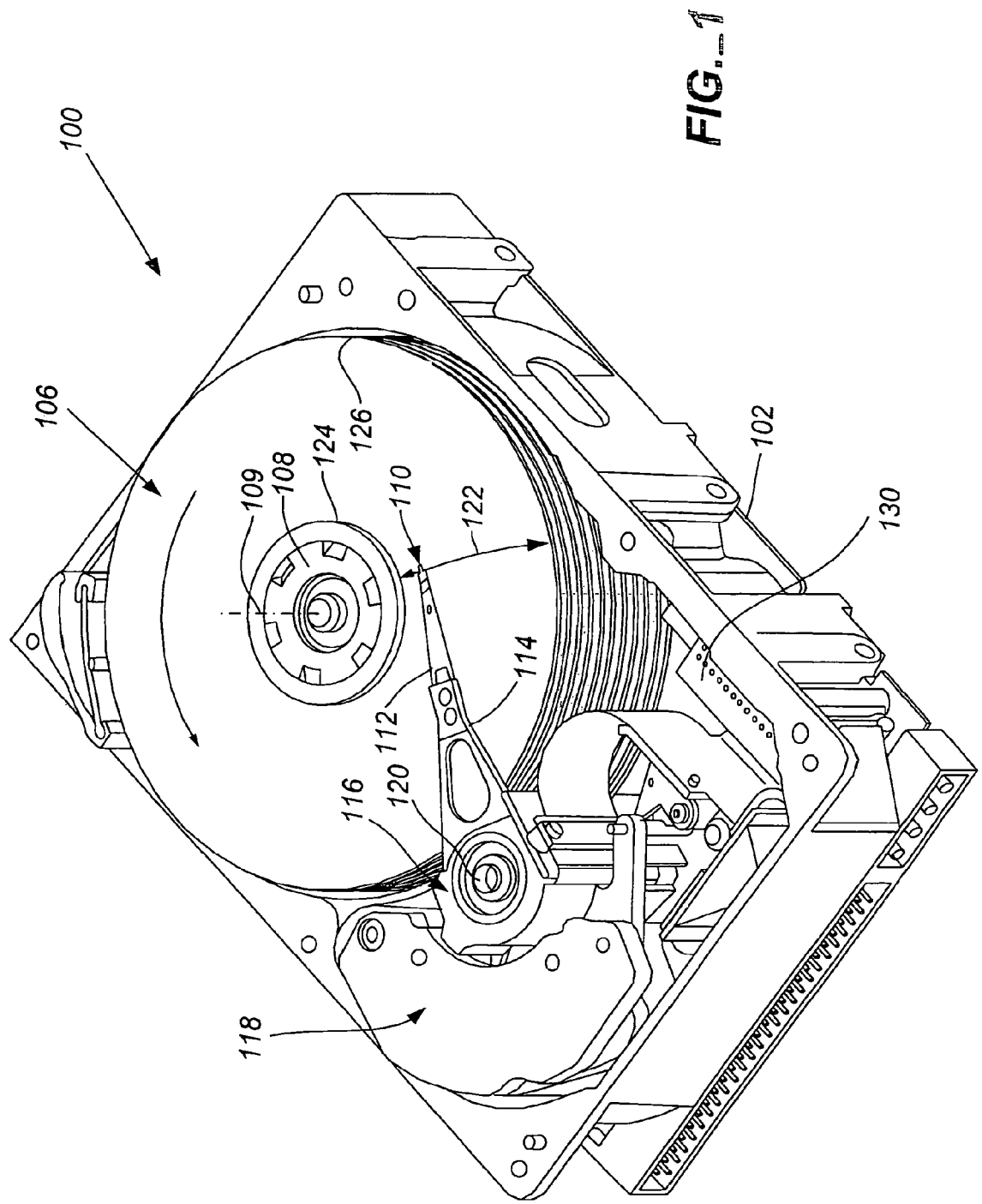
FIG. 1 is an isometric view of a disc drive in which embodiments of the present invention are useful.

Referring now to FIG. 1, an isometric view of a disc drive 100 in which embodiments of the present invention are useful is shown. The same reference numerals are used in the various figures to represent the same or similar elements. Disc drive 100 includes a housing with a base 102 and a top cover (not shown). Disc drive 100 further includes a disc pack 106, which is mounted on a spindle motor 132 (shown in FIG. 3) by a disc clamp 108. Disc pack 106 includes a plurality of individual discs, which are mounted for co-rotation about central axis 109. In some embodiments, instead of utilizing a disc pack, a single disc 106 is employed. Each disc surface has an associated disc head slider 110 which is mounted to disc drive 100 for communication with the disc surface. Surfaces of disc 6 are usually divided into zones, with each zone including multiple adjacent tracks. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics, which is included in control circuitry (or controller) 130, based on signals generated by heads 110 and a host computer 300 (shown in FIG. 3).

Referring now to FIG. 2, a disc surface 200 of a typical disc (such as a disc of disc pack 106 of FIG. 1) is shown. Each disc surface includes a plurality of radially concentric tracks to aid in location and readback of data. Each track (such as 202) is further broken down into a plurality of sectors (or physical memory locations), which further aid in location of a particular unit of information. In FIG. 2, portion 204 represents a single sector. These sectors are addressed using a linear addressing scheme called logical block addressing (LBA). For example, in a 540 Meg drive, LBA 0 corresponds to sector 1 (the first sector) of head 0 (the first head), cylinder or track 0 (the first cylinder or track), and successively proceeds along to the last physical sector on the drive which would be LBA 1,065,456.

As used herein, logical block addressing represents any linear addressing scheme. As mentioned above, disc drive 100 is a component of a computer and is utilized to store vast amounts of information relating to operating systems, applications, and other data (user data, copyrighted information, etc.). As indicated earlier, current schemes for the prevention of unauthorized access of data are primarily implemented in the host computer, with the disc drive having little or no control over the operation of these schemes.

The present invention is described below in connection with FIG. 3 which is a block diagram showing disc drive 100 of the present invention coupled to a host computer 300. In general, the present invention addresses earlier-mentioned problems with the prior art by providing a system for transcription of confidential information, which is implemented within disc drive 100 and is substantially transparent to host computer 300. For a better understanding of the data transcription system of the present invention, an environment in which disc drive 100 of the present invention is useful is first described below. Thereafter, details regarding data transcription within disc drive 100 in accordance with the present invention are provided.

In FIG. 3, disc drive 100 is coupled to host computer 300, which is an exemplary general-purpose computing device. Components of computer 300 may include a processing unit 310, a system memory 320, and a system bus 311 that couples various system components including the system memory to the processing unit 310. System bus 311 may be any of several types of bus structures including a memory bus or memory controller, a peripheral bus, and a local bus using any of a variety of bus architectures.

A user may enter commands and information into computer 300 through input devices such as a keyboard 342 and a pointing device 341, such as a mouse, trackball or touch pad. These and other input devices are often connected to the processing unit 310 through a user input interface 340 that is coupled to the system bus. A monitor 371 or other type of display device is also connected to system bus 311 via an interface, such as a video interface 370. Computer 300 may operate in a networked environment using logical connections to one or more remote computers, such as a remote computer 360 on which remote application programs 365 reside. The logical connections depicted in FIG. 3 include a local area network (LAN) 351 and a wide area network (WAN) 353, but may also include other networks. When used in a LAN networking environment, computer 300 is connected to LAN 351 through a network interface or adapter 350. When used in a WAN networking environment, computer 300 typically includes a modem 352 or other means for establishing communications over WAN 353, such as the Internet.

As mentioned above, computer 300 includes system memory 320 that is coupled to processing unit 310 via system bus 311. System memory 320 includes computer storage media in the form of volatile and/or nonvolatile memory such as read only memory (ROM) 321 and random access memory (RAM) 322. A basic input/output system 323 (BIOS), containing the basic routines that help to transfer information between elements within computer 300, such as during start-up, is typically stored in ROM 321. RAM 322 typically contains data and/or program modules that are immediately accessible to and/or presently being operated on by processing unit 310. By way of example, FIG. 3 illustrates operating system 324, application programs 325, other program modules 326, and program data 327.

As can be seen in FIG. 3, disc drive 100 is coupled to computer 300 via host-disc interface 330. Computer 300 transfers data to and reads data from disc drive 100 via host-disc interface 330. Host-disc interface 330 may be any type of data exchange interface for coupling a disc drive to a host computer, such as SCSI (Small Computer System Interface), UDMA (Ultra Direct Memory Access), ATA (Advance Technology Attachment), or other standards as are known in the industry or are developed in the future.

In disc drive 100, data is received from, or provided to, host computer 300 with the help of controller 130, which also implements the data transcription scheme of the present invention. In general, controller 130 carries out its functions by executing instructions contained in instruction memory 133.

Disc drive 100 provides storage of computer readable instructions, data structures, program modules and other data for computer 300. In FIG. 3, for example, disc drive 100 is illustrated as storing operating system 134, application programs 135, other program modules 136, and program data 137. Note that these components can either be the same as or different from operating system 324, application programs 325, other program modules 326, and program data 327. Operating system 134, application programs 135, other program modules 136, and program data 137 are given different numbers here to illustrate that, at a minimum, they are different copies.

Operating system 134, application programs 135, other program modules 136, and program data 137 are stored as files, with each file being stored over a cluster of sectors (or physical memory locations) referenced through LBAs. It should be noted that the organization and structure of files is controlled by the host computer with the help of the operating system. In general, a disc drive controller (such as 130) operates independently of the operating system and is therefore unaware of any LBA-file relationships. In other words, if the host computer (such as 300) sends data corresponding to a file to the disc drive (such as 100), the information reaches the disc controller (such as 130) as data to be stored in an LBA range. In response to receiving the data storage information, the controller (such as 130), with the help of head 110, simply stores the data in physical memory locations that correspond to the specified LBA range.

In general, the transcription scheme of the present invention, which is implemented in controller 130 and described in detail further below, is useful protecting certain confidential information that a user of the host computer does not own. For example, consider the case of a video stream that originated from a secure server (such as 360) and is currently stored or buffered in disc drive 100 for eventual playback on a secure video card (such as 370), which is capable of to processing encrypted data. This video data has to be protected from malicious users, from accidental user errors and from compromised hosts (hosts with viruses, worms, spyware, etc.). Prior art host-level data protection schemes cannot adequately secure such data if, for example, the host processor (such as 310) is interrupted as a result of the computer booting up in an insecure mode, thereby exposing the memory content, disc buffers, etc. To overcome these problems, the present invention provides a means to manipulate (copy, move, backup, restore) data without exposing the data to the host computer (or the user) in the clear (in an unencrypted form).

Specifically, in accordance with the present invention, controller 130 is configured to receive encrypted data (such as the video stream mentioned above) via host computer 300 in which data storage device 100 is employed. Controller 130 then decrypts, and re-encrypts, the received encrypted data. Controller 130 subsequently sends the re-encrypted data, via host computer 300, to another secure entity (such as video card 370), which is capable of decrypting the re-encrypted data. This technique ensures that no unencrypted data is exposed to the host computer. It should be noted that encrypted data received in disc drive 100 form a secure server (such as 360) is first decrypted and then re-encrypted in order to provide the data in a form that the secure entity (such as video card 370) can process. Instructions for data decryption, re-encryption (transcription) and other corresponding functions, which controller 130 is capable of executing, are stored in instruction memory 133.

It should be noted that the above-described transcription process is carried out to protect data corresponding to specific files. As mentioned above, the organization and structure of files is controlled by the host computer with the help of the operating system. Further, as noted earlier, disc drive controller (such as 130) operates independently of the operating system and is therefore unaware of any LBA-file relationships. Consequently, although blocks of data that constitute files are decrypted and re-encrypted in disc drive 100, host computer 1o to 300 has to make associations between the blocks that constitute any particular file. In accordance with the present invention, host computer 300 can utilize transcription handles (unique identifiers (or numbers) associated with each key) to select keys for data re-encryption (transcription), without being allowed access to the encryption keys themselves, thereby ensuring that confidential data is not exposed to the host in the clear. Table 1, shown below, is a transcription table that stores the encryption keys and the associated transcription handles along with other useful information for carrying out the transcription process.

TABLE 1

| Transcription Handle | Encryption Key | Encryption Algorithm | Decryption Key | Decryption Algorithm | Authentication and Authorization Information |
|---|---|---|---|---|---|
| 1 | 1010 | ... | ... | ... | ... |
| 2 | 1011 | ... | ... | ... | ... |

Tables 1 may be stored in non-volatile memory (on a disc surface, for example). In accordance with an embodiment of the present invention, a number of entries in the transcription table (equal to two in the example Table 1) and the transcription handles (such as 1 and 2 in Table 1) are known to host computer 300. However, the encryption keys (such as 1010 and 1011 in the example Table 1) are hidden from the host computer. Thus, as mentioned above, host computer 300 can utilize transcription handles to select keys for data re-encryption. In embodiments of the present invention, modified read and write commands are utilized for communicating read and write requests from the host computer to the disc drive. The modified commands are structured such that transcription handles can be accommodated within the read/write requests when applicable, thereby ensuring association between blocks of data that constitute any particular transcripted file. This is necessary because individual blocks of data that constitute a file are typically scattered (not stored in contiguous LBAs).

It should be noted that the transcription table is created at the time of disc manufacture. Records are added to the transcription table(s) and/or modified after the disc drive (such as 100) is installed in the host computer (such as 300). Additions, deletions and updates of records in the transcription table(s) can be carried out by utilizing any suitable commands that are compatible with host-disc interface protocols, for example.

Encryption keys are transferred in an encrypted form, to the drive, for storage in the transcription table. They are encrypted by the owner of the data, using, for example, a public key of the disc drive. Only the disc drive has a corresponding private key, and therefore the decryption of the keys used for the transcription process can take place only in the disc drive. In general, any entity can encrypt confidential information intended to be sent to the drive.

In some embodiments of the present invention, a user authentication process is carried out to determine whether or not a current user of the host computer (such as 300) is authorized to see files, setup for transcription, in the clear. User authentication in connection with the transcription scheme is preferably carried out at the time the user logs in to the host computer (such as 300). Authorized user identification information may be stored in, or tied (joined) to, the transcription table. In some embodiments, the user authentication procedure is primarily implemented in the operating system. In other embodiments, the user authentication procedure is primarily implemented in BIOS or in a BIOS extension, except providing the transcription handles for disc data transfer commands. It should be noted that no operating system changes are required when the user authentication is implemented in the BIOS or BIOS extension. In some embodiments, the user authentication scheme employs security tokens, biometric scanners, etc., which enhance the security of authentication beyond more basic pass phrases.

As mentioned above, contents of the transcription table(s) can be modified (records can be added, deleted and/or updated) by utilizing commands that are compatible with host-disc interface protocols. In embodiments of the present invention, a user authorization process is carried out to determine a level of access (no access, query only, or query and update) that a current user of the host computer (such as 300) has to the transcription table(s). The user authorization process may be carried out in conjunction with the user authentication process using techniques similar to those described above. User authorization information may be stored in a hidden area of the disc drive and may be loaded into the host computer (such as 300) during the authorization process.

As mentioned above, disc drive 100 of the present invention is capable of decrypting encrypted data and then re-encrypting the decrypted data. The decryption and re-encryption (transcription) can occur either before or after the data is stored on the disc surface(s). FIG. 4 is a flowchart 400 of a transcription-before-storage method embodiment of the present invention. At step 402, a data storage device (such as 100) receives encrypted data via a host computer (such as 300) in which the data storage device is employed. At step 404, the data storage device decrypts the encrypted data. The data storage device then re-encrypts the decrypted data at step 406. At step 408, the data storage device stores thereencrypted (transcripted) data on a storage medium (such as 200). FIG. 5 is a flowchart 500 of a transcription-after-storage method embodiment of the present invention. At step 502, a host computer (such as 300) requests transcripted data blocks form a data storage device (such as 100). At step 504, the data storage device retrieves, form a storage medium, stored encrypted data (which was previously sent to the data storage device and stored, without transcription, on the storage medium). At step 506, the data storage device decrypts the encrypted data. The storage device then re-encrypts the decrypted data at step 508. At step 10, the storage device transmits the re-encrypted (transcripted) data blocks to the host computer. Different techniques, some of which are set forth above, can be employed to carry out the steps shown in the flowchart of FIGS. 4 and 5 while maintaining substantially the same functionality without departing from the scope and spirit of the present invention.

In addition to being operational with general purpose computer 300 (FIG. 3), disc drive 100 of the present invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a data transcription system for a disc drive data storage system, it will be appreciated by those skilled in the art that the teachings of the present invention can be applied to any data storage system in which host-independent data transcription is desired, without departing from the scope and spirit of the present invention. Further, the transcription scheme of the present invention may be implemented in hardware and/or software within the data storage device.

What is claimed is:

1. A method comprising:
   (a) receiving, at an interface of a data storage device, a request from a host for data stored at a data storage medium of the data storage device, the interface being employed by the data storage device to communicate with the host, the interface having a physical connector to allow removal of the data storage device from the host, the interface configured to receive data and read and write commands from the host to retrieve and store the data from and to the data storage medium;
   (b) retrieving, by the data storage device, the data from the data storage medium, the data retrieved in an encrypted form;
   (c) decrypting, by the data storage device, the data and re-encrypting, by the data storage device, the data within the data storage device to produce re-encrypted data, the decrypting and re-encrypting occurring without exposing the host to any of the data in the clear; and
   (d) sending, by the data storage device via the interface, the re-encrypted data to the host.

2. The method of claim 1 wherein the decrypting and re-encrypting occur without exposing a user of the host to any of the data in the clear.

3. The method of claim 1 wherein the data storage device is employed as a hardware component by the host, and the host including a processing unit that is a separate hardware component from the data storage device.

4. The method of claim 1 wherein information related to the re-encrypted data is stored in a transcription table in the data storage device.

5. The method of claim 1 further comprising carrying out a user authentication process prior to carrying out steps (c) and (d), the user authentication process being carried out to determine whether or not the re-encrypted data can be provided to a current user of the host computer in an unencrypted form.

6. The method of claim 5 wherein user identification information for the user authentication process is stored in a transcription table.

7. The method of claim 6 wherein the user authentication process is carried out by a one of a basic input/output system, a basic input/output system extension and an operating system, which utilizes the user identification information from the transcription table.

8. The method of claim 1 wherein information related to the re-encrypted data is stored in a transcription table in the data storage device, and the method further comprising carrying out a user authorization process to determine whether the transcription table can be modified by a current user of the host.

9. A storage device controller for a data storage device comprising control circuitry configured to:
   store data to logical block address (LBAs) of a data storage medium in response to information from a host;
   receive encrypted data from the data storage medium;
   decrypt, by the storage device controller, the encrypted data to produce decrypted data;
   re-encrypt, by the storage device controller, the decrypted data within the data storage device without the host or a user of the host being exposed to any of the encrypted data in an unencrypted form; and
   send, via an interface of the data storage device, in response to a request from the host, the re-encrypted data to the host, the interface being employed by the storage device controller to communicate with the host, the interface having a physical connector to allow removal of the data storage device from the host, the interface configured to receive data and read and write commands from the host to retrieve and store the data from and to the data storage medium.

10. The storage device controller of claim 9 wherein information related to the re-encrypted data is stored in a transcription table.

11. The storage device controller of claim 9 wherein the controller is further configured to carry out a user authentication process prior to carrying out the receiving of the encrypted data and the decryption, and re-encryption, of the encrypted data, the user authentication process being carried out to determine whether or not the re-encrypted data can be shown to a current user of the host computer in the unencrypted form.

12. The storage device controller of claim 11 wherein user identification information for the user authentication process is stored in a transcription table.

13. The storage device controller of claim 12 wherein the user authentication process is carried out by a basic input/output system in conjunction with the controller, the basic input/out system utilizes the user identification information from the transcription table.

14. The storage device controller of claim 12 wherein the user authentication process is carried out by a basic input/output system extension in conjunction with the controller, the basic input/output system extension utilizes the user identification information from the transcription table.

15. The storage device controller of claim 12 wherein the user authentication process is carried out by an operating system in conjunction with the controller, the operating system utilizes the user identification information from the transcription table.

16. A method comprising:
   receiving, at an interface of a data storage device, a request from a host computer for data stored at a data storage medium, the interface being employed by the data storage device to communicate with the host, the interface having a physical connector to allow removal of the data storage device from the host, the interface configured to receive data and read and write commands from the host to retrieve and store the data from and to the data storage medium;
   retrieving, by the data storage device, the data from the data storage medium, the data received in an encrypted form;
   decrypting, by the data storage device, and re-encrypting, by the data storage device, the data within the data storage device without a processing unit of the host computer being exposed to any of the data in an unencrypted form; and
   sending, via an interface of the data storage device, the re-encrypted data to the host computer in response to the request.

17. The method of claim 16 further comprising
   receiving encrypted data from the host;
   decrypting the encrypted data to generate data in an unencrypted form;
   encrypting the data in the unencrypted form to generate other encrypted data; and
   storing the other encrypted data to the data storage medium.

18. The method of claim 16 further comprising:
   receiving encrypted data from the host;
   decrypting the encrypted data to generate data in an unencrypted form;
   encrypting the data in the unencrypted form to generate other encrypted data;
   storing the other encrypted data to the data storage medium; and
   the encrypted data received from the host is associated with a first encryption scheme and the other encrypted data is associated with a second encryption scheme.

* * * * *